United States Patent [19]

Shinozuka et al.

[11] Patent Number: 5,190,582
[45] Date of Patent: Mar. 2, 1993

[54] INK FOR INK-JET PRINTING

[75] Inventors: Masakazu Shinozuka; Hiroto Nakamura; Kenichi Kanbayashi; Yaeko Maruyama; Noriko Oyama; Hiroyuki Onishi, all of Suwa, Japan

[73] Assignee: Seiko Epson Corporation, Tokyo, Japan

[21] Appl. No.: 721,630

[22] PCT Filed: Nov. 21, 1990

[86] PCT No.: PCT/JP90/01516

§ 371 Date: Jul. 18, 1991

§ 102(e) Date: Jul. 18, 1991

[87] PCT Pub. No.: WO91/07470

PCT Pub. Date: May 30, 1991

[30] Foreign Application Priority Data

| Nov. 21, 1989 | [JP] | Japan | 1-302855 |
| Nov. 21, 1989 | [JP] | Japan | 1-302856 |
| Feb. 8, 1990 | [JP] | Japan | 2-29213 |
| Feb. 8, 1990 | [JP] | Japan | 2-29214 |
| Feb. 8, 1990 | [JP] | Japan | 2-29215 |
| Feb. 8, 1990 | [JP] | Japan | 2-29216 |
| May 17, 1990 | [JP] | Japan | 2-127431 |
| May 17, 1990 | [JP] | Japan | 2-127435 |
| May 18, 1990 | [JP] | Japan | 2-128774 |
| May 21, 1990 | [JP] | Japan | 2-130789 |

[51] Int. Cl.$^5$ ............................................. C09D 11/02
[52] U.S. Cl. ................... 106/20 D; 106/30 R; 106/403; 106/472; 106/476
[58] Field of Search .................. 106/20, 30, 403, 472, 106/476

[56] References Cited

U.S. PATENT DOCUMENTS

| 3,876,603 | 4/1975 | Makhlouf | 106/472 |
| 4,164,423 | 8/1979 | Schumacher et al. | 106/20 |
| 4,180,407 | 12/1979 | Gibson et al. | 106/403 |
| 4,366,138 | 12/1982 | Eisenmenger et al. | 106/476 |
| 4,959,661 | 9/1990 | Buxton et al. | 106/23 |
| 5,010,125 | 4/1991 | Kruse et al. | 106/30 |

FOREIGN PATENT DOCUMENTS

| 4812294 | 1/1974 | Japan . |
| 54-46606 | 4/1979 | Japan . |
| 56-2356 | 1/1981 | Japan . |
| 61-247762 | 11/1986 | Japan . |

Primary Examiner—William R. Dixon, Jr.
Assistant Examiner—Helene Klemanski
Attorney, Agent, or Firm—Ladas & Parry

[57] ABSTRACT

An ink composition for ink-jet printing, capable of producing a high-quality image without causing blur, comprising, as essential components, a coloring component and a dispersion medium in which the coloring component is homogeneously dispersed and retained, characterized in that the coloring component is insoluble in the dispersion medium and is dispersed therein in the state of finely divided particles of a size of 0.01 μm or more, that the dispersion medium comprises a liquid having a surface tension at 25° C. of 50 dyn/cm or less, and that the ink composition has the property that the dispersion medium immediately separates from the coloring component at the instant when the ink composition is deposited on an image-recording material.

13 Claims, 3 Drawing Sheets

INK FOR INK-JET PRINTING

TECHNICAL FIELD

This invention relates to an ink for use with an ink-jet printing apparatus which produces a character or image on a recording medium such as paper by jetting droplets of the ink thereon.

BACKGROUND ART

Conventional ink-jet printing methods can be broadly classified into two types, a continuous type and an on demand type. A dissolved-type aqueous ink composition prepared by dissolving a dye in water is mainly used as an ink for use with such ink-jet printing methods.

An ink which is prepared by dissolving various water-soluble dyes in water or in a mixture of water and a water-soluble organic solvent, and if necessary adding thereto various auxiliary components is now mainly used as the aqueous ink. The ink-jet printing methods have a great deal of potential due to the following advantageous properties: their printing processes are simple because they are of a direct printing type; no noises are produced upon printing because they are of a non-impact type; a color image can be easily produced; high-speed printing can be attained; the running cost is low because ordinary paper is usable as a recording medium; and a high-resolution image is obtainable because extremely fine droplets of an ink are jetted on a recording medium.

However, the above conventional methods suffer from some problems, although the problems are slightly different from one another depending upon the type of the methods. Among them, the common problems which should be solved are as follows:

(1) a jetted ink tends to be blurred on an image-receiving sheet, so that a high-quality image cannot be obtained;

(2) an ink jetted on an image-receiving sheet cannot dry in a short time, so that tailing of the ink is caused; and (3) a nozzle or ink-supplying path gets clogged by the ink, resulting in unstable jetting of the ink.

To solve the above-described problems, various proposals have been made; for instance, Japanese Patent Publication No. 55-29546 discloses an ink into which a specific surface active agent is incorporated in order to decrease the surface tension of the ink, thereby improving absorption of the ink in an image-receiving sheet; Japanese Patent Publication No. 56-57862 discloses a method in which a strong basic material is incorporated into an ink to raise its pH and to chemically dissolve a sizing agent and pulping agent, which are water repellents used for ordinary paper, thereby controlling expansion and absorption of dots of the ink; and Japanese Patent Publication No. 58-13675 discloses a method in which polyvinyl pyrrolidone having a molecular weight of 40,000 or more is incorporated into an ink to control expansion and absorption of dots of the ink in an image-receiving sheet. However, according to the view of the inventors of the present invention, it is considered that these proposals can solve only part of the previously-mentioned problems, and cannot be the complete solutions thereof.

SUMMARY OF THE INVENTION

Accordingly, an object of the present invention, which can solve the above problems, is to provide an ink for an ink-jet printer for use with an ink-jet printing method in which extremely fine droplets of an ink are jetted from a recording head and deposited on the surface of an image-receiving sheet to produce an image thereon, capable of producing a high-density character or image on ordinary paper without causing blur.

A second object of the present invention is to provide an ink for an ink-jet printer, which has high drying ability and can produce an image without tailing.

A third object of the present invention is to provide an ink for an ink-jet printer, which does not bring about clogging in a nozzle or ink-supplying path and is excellent in jetting stability.

DISCLOSURE OF THE INVENTION

The ink for ink-jet printing according to the present invention is characterized in that the ink composition is made into a disperse system, and that both the particle size of the coloring component serving as a dispersed phase and the surface tension of the dispersion medium are controlled to be in specific ranges, whereby the coloring component and the dispersion medium can be separated immediately from each other in the instant when the ink is deposited on an image-receiving sheet (for instance, paper) to produce an image without blur.

More specifically, the ink for ink-jet printing according to the present invention is an ink composition comprising, as essential components, a coloring component and a dispersion medium in which the coloring component is homogeneously dispersed and retained, characterized in that the coloring component is insoluble in the dispersion medium, and is dispersed therein as finely divided particles with an average particle size of 0.01 $\mu$m or more, that the dispersion medium comprises a liquid having a surface tension at 25° C. of 50 dyn/cm or less, and that the ink composition has such a property that the dispersion medium is instantly separated from the coloring component when the ink composition is deposited on an image-receiving material.

Heretofore, it has been considered that the separation between a coloring component and a solvent (vehicle) contained in an ordinary ink composition, caused on an image-receiving material, is an unfavorable phenomenon, and it should be avoided. The inventors of the present invention have reversed such a conventional common idea regarding an ink, and have found that such a separation is effectively utilizable to an ink for ink-jet printing. The present invention has been accomplished based on this finding.

In the case where an image is printed on ordinary paper by using the above-described ink of the present invention, the coloring component contained in the ink deposited on the paper is fixed on a spot where the ink has been deposited, and only the dispersion medium spreads along fibers of the paper to enlarge its surface area. As a result, the ink can be dried immediately. Thus, the coloring component and the dispersion medium are instantly separated from each other when the ink is deposited on the paper, so that the coloring component does not migrate, together with the dispersion medium, along fibers of the paper. For this reason, blur of an image can be prevented.

It is not entirely clear the reason why the separation between the coloring component and the dispersion medium contained in the ink is instantly caused when the ink is deposited on the paper, and blur of an image can be effectively prevented. However, considerable main reasons are as follows: the dispersion medium has a low surface tension, so that it can migrate along the fibers of the paper in an extremely short time by utilizing capillary phenomenon; and migration of the coloring component after deposition on the paper is prevented due to cohesive power between particles of the coloring component in a dispersed state, and relatively high cohesive power between the coloring component and the paper. Since the ink of the present invention gives rise to the above-described separation phenomenon, it can produce an image which has high quality and also has improved resistance for scratch.

The above-described phenomenon can be explained by referring to FIG. 1. In FIG. 1, the portion indicated by reference numeral 1 is called a ring blur, and the boundary portion indicated by reference numeral is called a contour. The ring blur 1 is formed when the dispersion medium contained in the ink for an ink-jet printer according to the present invention permeates an image-receiving sheet (in the case of an OHP sheet, the dispersion medium diffuses thereon), and is dried by evaporation and disappears with the passage of time. The state of an ink dot printed on an image-receiving sheet by using a conventional ink for use with an ink-jet printer is shown in FIG. 2. The ink dot shown in FIG. 1 and the one shown in FIG. 2 are formed by the same amount of the respective ink droplets, and are illustrated in the same scale. As is understood from these two figures, the conventional ink for an ink-jet printer is absorbed by an image-receiving paper, and diffuses along fibers of the paper, so that blur is formed as indicated by reference numeral 3, and a produced image has low density. Moreover, the shape of the dot is far from a circle; this is the main reason for impairing the quality of an image printed. In comparison, the ink for use with an ink-jet printer according to the present invention does not permeate along fibers of paper, and forms a circular dot with a clear contour. For this reason, the ink of the invention can produce a high-density image having high quality, and is also employable for high-resolution printing.

BEST MODE FOR CARRYING OUT THE INVENTION

Figure 1:
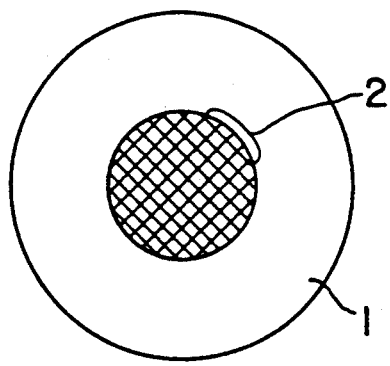
FIG. 1, FIG. 3 and FIG. 7 are schematic illustrations respectively showing the state of the ink according to the present invention when it is deposited on an image-receiving material (paper)
Figure 2:
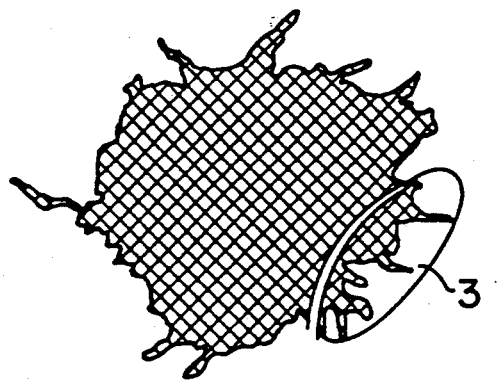
FIG. 2, FIG. 6 and FIG. 8 are schematic illustrations respectively showing the state of the conventional ink when it is deposited on an image-receiving material (paper)

The components contained in the ink composition of the present invention will be hereinafter explained specifically.

Pigments and dyes which can exist in the ink in a dispersed state are usable as the coloring component.

Examples of the pigments are inorganic pigments (for example, metal oxides and carbon black), organic pigments (for example, insoluble azo pigments, soluble azo pigments, phthalocyanine-type pigments, isoindolinone-type higher pigments, and perynone.perylene-type higher pigments), and the like. In addition, processed pigments whose particles are coated with a resin or the like are also employable. To improve the quality of an image printed, it is also necessary that the size distribution of particles of the pigment be as narrow as possible.

Preferred examples of the pigment are metal oxides such as iron oxide. Preferred specific examples of iron oxide are Talox BLs-500 and 100 manufactured by Titan Kogyo K.K., MTBs-10 and 15 manufactured by Morishita Bengara Kogyo Co., Ltd., EPTs-500, 1000, 1001 and 1002, and MATs-305 and 305HD manufactured by Toda Kogyo K.K., and the like. In addition to the above, processed pigments such as metal oxides and iron oxides, coated with a resin or the like are also employable. The combination use of two or more types of these pigments is acceptable, if necessary.

Almost all organic pigments can be used as the coloring component. For instance, Hansa Yellow 10G, Brilliant Carmine 6B, Phthalocyanine Blue, Phthalocyanine Green, etc., and Paliogen Black 0084 available from BASF Japan Ltd., etc. can be mentioned.

As other processed pigments, Microlith A treated with ethyl cellulose (for instance, Microlith Black C-A), and Microliths K and KP treated with a copolymer of vinyl chloride and vinyl acetate (for instance, Microlith Black C-T) manufactured by CIBA-GEIGY, LTD., and the like can be mentioned.

In the case where carbon black is used as the pigment, those carbon blacks which have a DBP oil absorption of 100 ml/100 g or less, and/or a specific surface area of 300 $m^2$/g or less are preferably employable in the present invention. Specific examples of the carbon black are listed in the table below.

| Manufacturer | Specific Examples of Carbon Black | | |
|---|---|---|---|
| | Trademark | DBP Oil Absorption (ml/100 g) | BET Specific Surface Area ($m^2$/g) |
| Mitsubishi Chemical Industries, Ltd. | CF-9 | 65 | 60 |
| | MA-100 | 100 | 134 |
| | MA-7 | 65 | 137 |
| | #44 | 76 | 125 |
| | #5B | 69 | 25 |
| | #45 | 53 | 137 |
| | #900 | 55 | 250 |
| Degussa Japan Co., Ltd. | Printex 75 | 47 | 150 |
| | Printex 90 | 95 | 300 |
| | Printex 55 | 48 | 110 |
| Columbian Carbon Ltd. | Raven 1020 | 60 | 95 |
| | Raven 1255 | 56 | 125 |
| Cabot Corp. | Monarch 800 | 75 | 210 |
| | Monarch 1100 | 65 | 240 |

Drying of the dispersion medium at a nozzle, which obstructs stable jetting of the ink, can be prevented by controlling the boiling point of the dispersion medium to high, and its saturated vapor pressure to low. An ink containing such a dispersion medium is far superior to conventional aqueous inks in this point. In addition, the easy formation of a structure can be prevented by properly controlling the DBP oil absorption or the specific surface area of the carbon black. In other words, the once dispersed carbon black does not easily form a structure, so that the easy formation of a secondary coagulation is also prevented. As a result, the probability of existence of large particles in the ink, which can be a cause for clogging, is reduced, and stable jetting of the ink is ensured.

The optimum particle size of the above-described coloring component is determined depending upon the kind of the coloring component and that of the dispersion medium employed. In general, however, the particle size of the coloring component is preferably 0.01 $\mu m$ or more, more preferably 0.01–10 $\mu m$, and most preferably 1–5 $\mu m$. When the particle size of the coloring component is less than 0.01 $\mu m$, it is difficult for the ink to give rise to the previously-mentioned separation phenomenon, so that the aimed effect, which is improvement in the quality of a printed image, cannot be sufficiently obtained.

Furthermore, it is preferable that 90% or more of total particles of the coloring component contained in the ink composition have sizes which are within ±50% of the average particle size. The inventors of the present invention have found that blur of the ink can be effectively prevented when particles of the coloring component contained in the ink have a narrow size distribution. The reason of this has not been perfectly clarified. It is however presumed that when particles of the coloring component are almost uniform in size, the coloring component diffuses or migrates at a constant speed, so that the coloring component is fixed at a spot where the ink has been deposited, and is prevented from diffusion toward the outside of the printed position. It is suitable that the content of the coloring component be in the range of 1–20 wt. %.

Organic solvents are used as the dispersion medium in which the above-described coloring component is dispersed. Specifically, a suitable organic solvent can be selected, with consideration of whether it is polar or non-polar, or it has insulating ability or not, depending upon the type of head of an ink-jet printer with which the ink of the present invention is employed Specifically, butyl cellosolve, methyl carbitol, ethyl carbitol, and the like are usable as the polar organic solvents. As the non-polar organic solvents, aliphatic hydrocarbon type solvents, for instance, Isopar available from Exxon Chemical Japan Ltd., Soltrol manufactured by Phillips Petroleum Co., Ltd., and IP Solvent manufactured by Idemitsu Petrochemical Company, Ltd. can be used. As petroleum naphtha type solvents, Naphthas No. 5 –No. 7 available from Exxon Chemical Japan Ltd. can be used As other hydrocarbon type solvents, Solvesso available from Exxon Chemical Japan Ltd., Shell S.B.R. and Shellsol manufactured by Shell Kagaku K.K., Pegasol manufactured by Mobil Petroleum Co. Inc., and the like are usable. Low toxicity, low flammability and less odor are the properties which should be also taken into consideration when selecting the solvent. The combination use of two or more types of the above solvents is also acceptable, if necessary.

In the present invention, it is necessary to control the surface tension (at 25° C.) of the dispersion medium to 50 dyn/cm or less, preferably 35 dyn/cm or less. When the surface tension is in excess of 50 dyn/cm, the separation between the coloring component and the dispersion medium takes place slowly, so that it is difficult to obtain the aimed action and effect of the present invention.

The surface tensions of the organic solvents for use in the present invention are shown in the table below. The values of the surface tensions of the polar solvents are taken from the "Solvent Handbook" published by Kodansha, and those of the non-polar solvents are taken from the data according to the respective manufacturers thereof.

| Polar Non-polar | Manufacturer | Name of Solvent | Surface Tension (dyn/cm) |
| --- | --- | --- | --- |
| Polar | — | Butyl cellosolve | 27.4 25° C. |
|  | — | Methyl carbitol | 34.8 25° C. |
|  | — | Ethyl carbitol | 31.8 25° C. |
| Non-Polar | Idemitsu Petrochemical Co., Ltd. | IP Solvent 1620 | 24.6 23° C. |
|  |  | IP Solvent 2028 | 26.1 23° C. |
|  | Exxon Chemical Japan Ltd. | Exxon Naphtha No. 6 | 24.6 25° C. |
|  |  | Solvesso 100 | 29.0 25° C. |
|  |  | Solvesso 150 | 30.0 25° C. |
|  |  | Solvesso 200 | 35.9 25° C. |
|  |  | Exxol D40 | 24.6 25° C. |
|  |  | Exxol D80 | 26.5 25° C. |
|  |  | Exxol D100 | 26.7 25° C. |
|  |  | Isopar G | 22.7 25° C. |
|  |  | Isopar H | 23.3 25° C. |
|  |  | Isopar L | 23.9 25° C. |
|  |  | Isopar M | 24.1 25° C. |
|  | Mobil Petroleum Co., Inc. | Pegasol AS100 | 24.5 25° C. |
|  |  | Sartlex 60 | 28.3 25° C. |
|  | Shell Kagaku K.K. | Shellsol D40 | 24.5 20° C. |
|  |  | Shellsol D70 | 26.0 20° C. |
|  |  | Shellsol 70 | 23.0 20° C. |
|  |  | Shellsol 71 | 24.0 20° C. |

The surface tension of the dispersion medium can be controlled to an optimum value by incorporating thereinto a surface active agent which is compatible with an organic solvent.

In the present invention, aiming at obtaining the effect of protecting the coloring component after printing, a resin which is compatible with the dispersion medium can be added thereto. Since such a resin is soluble in the dispersion medium, it separates, together with the dispersion medium, from the coloring component when an image is printed, and then spreads and dries. The dried resin is then separated out again to protect the coloring component fixed at the printed portion Specifically, polar resins such as ethyl cellulose, polyacrylester, a linseed oil-modified alkyd resin, polystyrene, polyvinyl chloride, chlorinated polypropylene, a polyamide resin, a coumarone-indene resin, a rosin type resin, a terpene-phenol type resin, an alkylphenol-modified xylene resin, and the like are preferably employed. Of these resins, a terpene-phenol type resin and a rosin type resin are more preferred. Furthermore, those resins which are soluble in a solvent are preferable from the viewpoint of the preservability of the ink. It is also preferable that the melting point or softening point of the resin be 50° C. or more from the viewpoint of blocking of a recording material which is caused after printing. The combination use of two or more types of these resins is acceptable, if necessary. In the case where two or more types .of the resins are used, nonpolar resins such as an aliphatic hydrocarbon type resin and an alicyclic hydrocarbon type resin can be employed when one of the resins employed is a polar resin. The content of the resin is preferably 1–30 wt. %, and more preferably 1–20 wt. %. The above-described resins are specifically shown in the table below.

| Manufacturer | Trademark | Type of Resin |
| --- | --- | --- |
| Arakawa Chemical Industries Ltd. | Super Ester 75 | Specific rosin ester resin |
|  | Ester Gum HP | Hydrogenated rosin pentaerythritol |

| Manufacturer | Trademark | Type of Resin |
|---|---|---|
| | | ester resin |
| | Markeed 33 | Rosin-modified maleic acid resin |
| Yasuhara Chemical K.K. | YS Polyester T80 | Terpenephenol resin |
| Shin-Nittetsu Kagaku K.K. | Escron G90 | Coumarone-indene resin |
| Sanyo Trading Co., Ltd. | Paralloide B67 | Acrylic type resin |
| Mitsui Petrochemical Industries, Ltd. | Hiretts HRT200X | Aliphatic hydrocarbon type resin |

As a dispersing agent, which may be employed when necessary, any dispersing agent is usable as long as it is compatible with the above-described solvent, or can be stably dispersed therein. Specific examples of the dispersing agent are nonionic surface active agents such as sorbitan fatty acid esters (sorbitan monooleate, sorbitan monolaurate, sorbitan sesquioleate, sorbitan trioleate, etc.), polyoxyethylenesorbitan fatty acid esters (polyoxyethylenesorbitan monostearate, polyoxyethylenesorbitan monooleate, etc.), polyethyleneglycol fatty acid esters (polyoxyethylene monostearate, polyethyleneglycol diisostearate, etc.), polyoxyethylene alkyl phenylethers (polyoxyethylene nonylphenyl ether, polyoxyethyleneoctylphenyl ether, etc.), and fatty acid diethanol amides. The combination use of two or more types of these dispersing agents is acceptable, if necessary. The content of the dispersing agent is preferably 0.01-5 wt. %. The above-described dispersing agents are specifically shown in the table below.

| Manufacturer | Trademark | Type of Dispersing Agent |
|---|---|---|
| ICI Corp. | Solsperse 17000 | Fatty acid diethanol amide type |
| Nikko Chemicals Co., Ltd. | Nikkol T106 | Polyoxyethylene sorbitan monooleate type |
| | Hexagline 4-0 | Hexaglyceryl tetraoleate type |
| | Nikkol MYS-IEX | Polyoxyethylene monostearate type |

The ink of the present invention may be prepared by dispersing the above-described components by a dispersing mill such as a ball mill, an attriter or a sand mill to obtain a homogeneous dispersion which may be subjected to filtration using a filter or the like to remove therefrom macro particles, dusts, and the like, if necessary. It is necessary that the viscosity of the ink be 30 mpa·s or less, preferably from 2 mpa·s to 15 mpa√s, from the viewpoints of the formation of droplets of the ink and stable jetting thereof under high response of the head, when the operation temperature of an ink-jet printer is set at 0° C.-50° C.

In the present invention, such a case is also included that the coloring component is dispersed in the dispersion medium in an emulsified state. To prepare such a disperse system, for instance, a dye is contained in a resin which is insoluble in the dispersion medium (hereinafter may be referred to as a binder agent) to form a dispersed phase. In such an embodiment, for instance, the ink composition comprises a dye, a solvent having a high boiling point and low volatility, and a binder agent; the binder agent contains the dye, and is dispersed in the dispersion medium as finely divided particles to give a colloidal fluid.

Figure 4:
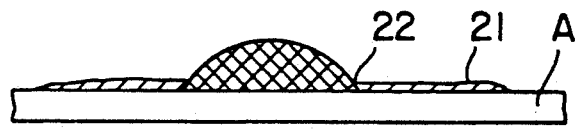
FIG. 4 and FIG. 5 are cross-sectional views respectively showing the state of the ink according to the present invention when it is deposited on an image-receiving material (paper).

In order to develop a liquid ink which can produce a high-quality image on any kind of image-receiving medium, has water resistance, does not cause clogging, and is excellent in recording stability and preservation stability, the inventors of the present invention experimentally prepared inks by using various dyes, organic solvents and binder agents in combination. As a result, it was found that when particles of the resin homogeneously dispersed in the dispersion medium impregnate, adsorb or support the dye of the coloring component, only the color component is fixed on an image-receiving sheet, and only the solvent permeates, diffuses or issues to the image-receiving sheet, thereby immediately causing separation between the coloring component and the solvent to form a film in a shape of dot with a clear contour as shown in FIG. 4, followed by solidifying and fixation. The ink is also excellent in the drying ability; and an image produced on an image-receiving sheet is not seen from the reverse side thereof, and is free from tailing and the like because of the surface film of the binder agent formed by the separation and the evaporation of the solvent.

Clogging of the ink can be prevented by using an organic solvent having a high boiling point and low volatility as the dispersion medium in which finely divided particles of the coloring component are dispersed.

Figure 3:
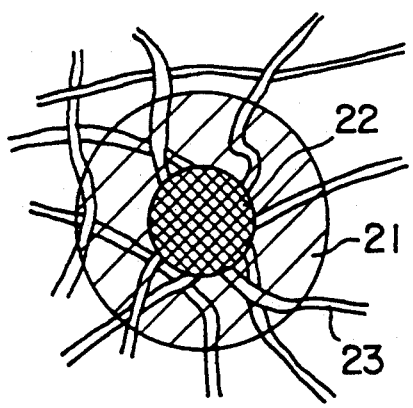
Figure 5:
Figure 6:
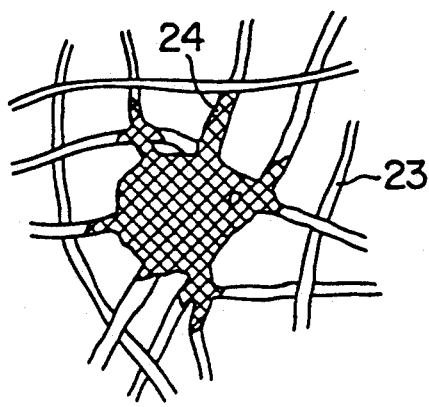
Figure 7:
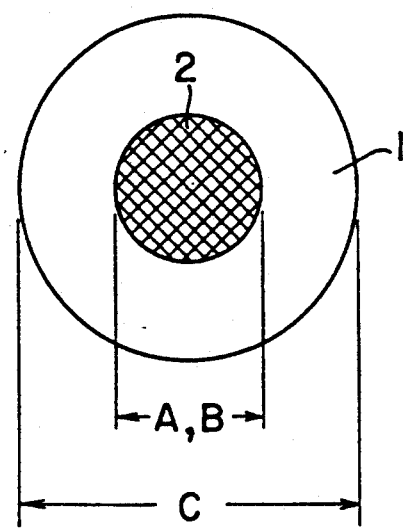
Figure 8:
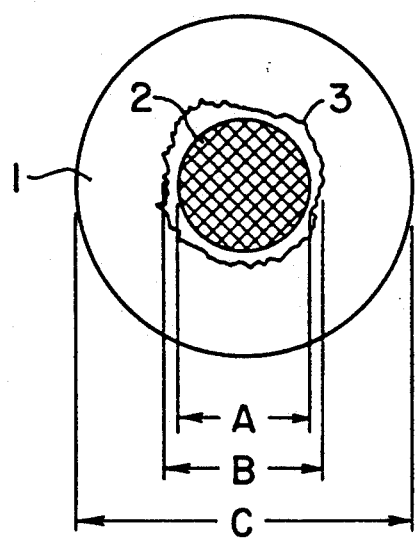

In the present invention, the portion indicated by reference numeral 21 in FIG. 3 is called a ring blur, and the boundary portion indicated by reference numeral 22 is called a contour. The state as shown in FIG. 4 (separated only at the surface), and the state as shown in FIG. 5 (permeated into the image-receiving sheet A) are also included in embodiments of the separation. Further, the portion indicated by reference numeral 24 in FIG. 6 is called a blur. In the present invention, such a blur of the coloring component which is brought about along fibers can be prevented.

As the coloring component which is employed in the above-described emulsion-type ink, any water-soluble dye or oil-soluble dye, which has been used for conventional inks, can be employed as long as it does not undergo a change in its color tone and does not produce a precipitate when the other components of the ink are added thereto.

For instance, basic azo dyes, acidic azo dyes, direct dyes, anthraquinone type dyes, carbonium dyes, rhodamine dyes, quinoneimine dyes, etc. can be mentioned.

These dyes are homogeneously dispersed, as the coloring component, in the dispersion medium in such a state that they are impregnated by, chemically bonded to, or supported by particles of a resin or wax.

As a material to be colored (that is, the binder agent), a homopolymer, a copolymer resin emulsion, a wax emulsion, or the like of a vinyl ester type, an acrylic acid ester type, a methacrylic acid ester type, a styrene type, or an olefin type monomer can be employed.

To homogeneously retain particles of the coloring component in the dispersion medium, various surface active agents and dispersing agents are added, or a surface treatment, graft polymerization or the like is conducted.

Moreover, in order to color the emulsion particles, a solubilizing agent which can impregnate a dye is added, a dye is added at the process of emulsion polymerization for preparing an emulsion, or a dye is dissolved in a thermally fused resin or wax which is insoluble in the dispersion medium and mechanically dispersed by using a dispersing agent.

The incorporation amount of the dye in the above emulsion system is preferably from 0.5 to 20 wt. %. This is because when the amount of the dye is less than 0.5 wt. %, the desired color tone and density cannot be obtained, and when it exceeds 20 wt. %, clogging and deterioration of the preservation stability may be caused.

As the preferred organic solvent for use in the emulsion-type ink, normalparaffin type hydrocarbons, isoparaffin type hydrocarbons, aliphatic hydrocarbons, and halogenated aliphatic hydrocarbons can be mentioned. Paraffin type or alicyclic type hydrocarbons having a boiling point of 150°-250° C. are preferred from the viewpoints of odor, safety, and drying ability. For instance, Isopars G, H, K, L and L (manufactured by Exxon Chemical Ltd.), IP Solvent (manufactured by Idemitsu Petrochemical Company, Ltd.), Shellsol 71 (Shell Kagaku K.K.), and the like are favorably employed.

As preferred organic-solvent-soluble-type resins, rosin type resins, terpene type resins, petroleum resins, coumarone-indene resins, styrene type resins, phenol type resins, xylene type resins, acryl type resins, and the like can be employed.

The present invention has the above basic structure. However, conventionally known dispersing agents, surface active agents, emulsifiers, viscosity regulators, specific resistance regulators, antifungal agents, and the like can be added, if necessary.

Regarding the property of the ink, in the case where the operation temperature is adjusted to 0° C.-50° C., it is preferable, from the viewpoints of stable supply of the ink and stable jetting of droplets of the ink under high-speed response of the head, that the ink reveal a viscosity of 30 mpa·s or less in the vicinity of a jet nozzle. Furthermore, in order to attain high-speed response, the above viscosity of the ink is more preferably 2.0-15.0 mpa·s.

The ink can be prepared by mixing the above components, and dispersing by a dispersing mill such as a ball mill, an attriter or a sand mill to give a homogeneous dispersion. If necessary, macro particles, dusts, etc. may be removed by filtration using a filter or the like.

The coloring component is homogeneously dispersed in a cooled dispersion medium in any one of the following manners: a manner utilizing electric double phases, a manner utilizing protection effect of an absorptive layer which is formed by a surface active agent or polymeric protective colloid, a manner in which a polymer having a functional group which has a reactive group soluble in a dispersion medium is bonded to the surface of the coloring component by means of a chemical reaction, a manner in which the above-described coupling agent is bonded to the surface of the coloring component by means of a chemical reaction, and a manner in which emulsion polymerization is conducted.

Macro particles, dusts, contaminated materials and the like are removed by filtration under reduced pressure or pressure, if necessary. Further, in order to obtain a final ink, stirring or blending is needed.

The present invention will now be explained more specifically by referring to the examples. However, the following examples should not be construed as limiting the present invention.

EXAMPLE 1-1

| Formulation | weight % |
|---|---|
| Carbon Black MA-100 (manufactured by Mitsubishi Chemical Industries, Ltd.) | 2.0 |
| Solsperse 17000 (dispersing agent, manufactured by ICI Corp.) | 0.1 |
| Isopar G (manufactured by Exxon Chemical Ltd.) | 97.9 |

Solsperse 17000 was added to Isopar G, and dissolved by stirring. To the resulting solution, Carbon Black MA-100 was added, and dispersed by an attriter for 5 hours, followed by filtration with pressure using a membrane filter made of Teflon, having a pore size of 10 μm, thereby obtaining an ink having a viscosity of 2.3 mpa·s at 25° C. In Examples 1-2 to 1-11, inks having the formulations shown in Table 1 were respectively prepared in the same manner as the above.

EXAMPLE 2-1

| Formulation | weight % |
|---|---|
| Carbon Black MA-100 (manufactured by Mitsubishi Chemical Industries, Ltd.) | 7.0 |
| Ester Gum HP (manufactured by Arakawa Chemical Industries, Ltd.) | 10.0 |
| Solsperse 17000 (dispersing agent, manufactured by ICI Corp.) | 0.1 |
| Isopar M (manufactured by Exxon Chemical Ltd.) | 82.9 |

Ester Gum HP and Solsperse 17000 were added to Isopar M, and dissolved by stirring. To the resulting solution, Carbon Black MA-100 was added, and dispersed by an attriter for 5 hours, followed by filtration with pressure using a membrane filter made of Teflon, having a pore size of 10 μm, thereby obtaining an ink having a viscosity of 5.3 mpa·s at 25° C. In Examples 2-2 to 2-33, inks having the formulations shown in Table 2 were respectively prepared in the same manner as the above. It is noted that in order to obtain a narrower particle size distribution, the components were dispersed in the attriter for 10 hours in Example 2-30, for 12 hours in Example 2-31, and for 10 hours in Example 2-32.

The ink of the present invention reveals a non-Newtonian flow. The viscosity of the ink was estimated, in accordance with the Casson theory, from a shear speed at the time of jetting from an ink jet head no. measured by an RFS-II manufactured by Rheometrics Fa. East Ltd. The distribution of the particle sizes was measured by an electrophoresis light scattering apparatus, ELS-800 manufactured by Otsuka Denshi K.K.

COMPARATIVE EXAMPLES

Comparative Examples are as follows:

As Comparative Example 1, a commercially available aqueous dye ink for use with an ink-jet printer was employed. The surface tension of the ink was 52 dyn/cm at 25° C.

As Comparative Examples 2 and 3, the following oil-dye-dissolved-type inks were employed:

| Comparative Example 2: | |
|---|---|
| Sudan Black X60 | 8.0% |
| (Oil dye, manufactured by BASF Japan Ltd.) | |
| Pegasol AS-100 | 92.0% |
| Comparative Example 3: | |
| Sudan Black X60 | 8.0% |
| YS Polyster T80 | 15.0% |
| Solsperse 1700 | 0.1% |
| Isopar G | 76.9% |

As Comparative Example 4, an ink containing the following non-polar resin was employed.

| Comparative Example 4: | |
|---|---|
| Carbon Black MA-100 | 6.0% |
| Hiretts HRT200X | 15.0% |
| Nikkol TO-106 | 1.5% |
| Isopar H | 77.5% |

As Comparative Example 5, an ink containing carbon black having a DBP oil absorption of more than 100 ml/100 g was employed.

| Comparative Example 5: | |
|---|---|
| Carbon Black Printex XE2 | 5.0% |
| (manufactured by Degussa Japan Co., Ltd., DBP oil absorption = 400 ml/100 g) | |
| YS Polyster T80 | 10.0% |
| Hexagline 4-0 | 1.0% |
| Isopar H | 84.0% |

As Comparative Example 6, an ink containing carbon black having a BET specific surface area of more than 300 $m^2/g$ was employed.

| Comparative Example 6: | |
|---|---|
| Carbon Black Raven 5250 | 5.0% |
| (manufactured by Columbian Carbon Corp., BET specific surface area = 525 $m^2/g$) | |
| YS Polyster T80 | 10.0% |
| Hexagline 4-0 | 1.0% |
| Isopar H | 84.0% |

As Comparative Example 7, an ink having a wide particle size distribution, prepared by dispersing the components by an attriter for two hours was employed.

| Comparative Example 7: | |
|---|---|
| Carbon Black MA-100 | 5.0% |
| Super Ester A-75 | 10.0% |
| Solsperse 17000 | 1.3% |
| Isopar G | 83.7% |

By using the inks prepared in the above Examples and Comparative Examples, bit-image printing and character-image printing were respectively conducted by a commercially available ink-jet printer on various image-receiving sheets of high quality paper, bond paper, PPC paper, an OHP sheet, and the like. The printed images were evaluated with respect to the following items a-1 to a-6:

(a-1) Blur of Printed Image: After printing on the various image-receiving sheets, images were observed visually or by a microscope as to whether or not the ink was blurred, and evaluated in accordance with the following standard

| | |
|---|---|
| No blur was found in the printed image by a visual observation and even by a microscopic observation | very favorable (⊚) |
| Blur was found in the printed image by a microscopic observation | favorable (○) |
| Blur was found in the printed image by a visual observation | unfavorable (×) |

(a-2) Scratch Resistance of Printed Image: After printing on the various image-receiving sheets, the surfaces of the printed images were rubbed with a clip with a load of 200 kg/$cm^2$ until stained, and evaluated in accordance with the following standard:

| | |
|---|---|
| Not stained when rubbed reciprocatingly 30 times or more | very favorable (⊚) |
| Stained when rubbed reciprocatingly 20-30 times | favorable (○) |
| Stained when rubbed reciprocatingly 20 times or less | unfavorable (×) |

(a-3) Blocking of Printed Image: A sheet of blank recording paper was superposed on the recording paper at a high temperature of 50° C., and was pressed for 24 hours. Thereafter, the blank recording paper was observed as to whether or not the ink had been transferred thereto, and evaluated in accordance with the following standard:

| | |
|---|---|
| No transfer of the ink was found | very favorable (⊚) |
| Transfer of the ink was found | unfavorable (×) |

(a-4) Preservability of Ink: After preservation at a high temperature of 70° C for 3 months, the inks were observed, and evaluated in accordance with the following standard:

| | |
|---|---|
| Precipitated, but the precipitate could be easily dispersed again | very favorable (⊚) |
| Precipitated, but the precipitate was not a coagulation (hard cake) | favorable (○) |
| Precipitated, and the precipitate was a coagulation | unfavorable (×) |

(a-5) Clogging in Nozzle: The ink-jet printer was filled with the ink, and was allowed to stand at 50° C. for one month without putting a cap on the nozzle. Thereafter, the ink was jetted from the nozzle, and evaluated in accordance with the following standard:

| | |
|---|---|
| Jetted immediately | very favorable (⊚) |
| Jetted after a moment or when rubbed with a rubber plate | favorable (○) |
| Not jetted | unfavorable (×) |

(a-6) Drying Speed of Printed Image: Solid printing was conducted on PPC paper, and the solid image was rubbed with PPC paper. The time after which the PPC paper was not stained any more with the ink was measured.

| | |
|---|---|
| 20 seconds or less | very favorable (⊚) |
| 20–40 seconds | favorable (○) |
| 40 seconds or more | unfavorable (×) |

The results are shown in Table 3.

With respect to the size distribution of particles, when the dispersing time in an attriter is 10 hours or more, almost 90% or more of the total particles have particle sizes which are within ±50% of the average particle size. However, the size distributions of particles of the inks prepared in Examples 2-31, 2-32 and 2-33, and Comparative Example 7 were precisely confirmed. The results are shown in the table below.

| | Example 2-31 | Example 2-32 | Example 2-33 | Comparative Example 7 |
|---|---|---|---|---|
| Rate of total particles whose sizes are within ±50% of the average particle size (wt. %) | 91.1 | 93.3 | 91.5 | 40.1 |

Is was also confirmed that the quality of the images printed by using the inks prepared in Examples 2-31, 2-32 and 2-33 were the most excellent.

TABLE 1

| | Example 1-1 | Example 1-2 | Example 1-3 | Example 1-4 | Example 1-5 |
|---|---|---|---|---|---|
| (Coloring Component) Carbon Black | | | | | |
| MA-100 | 2.0 | | | | 2.0 |
| CF-9 | | 5.0 | | | |
| Organic Pigment | | | | | |
| Paliogen Black 0084 | | | 7.0 | | |
| Hansa Yellow 10G | | | | 4.0 | |
| Brilliant Carmine 6B | | | | | |
| Phthalocyanine Blue | | | | | |
| Phthalocyanine Green | | | | | |
| Processed Pigment | | | | | |
| Microlith Black C-T | | | | | |
| (Solvent) | | | | | |
| Polar Solvent | | | | | |
| Butyl cellosolve | | | | | |
| Methyl carbitol | | | | | |
| Ethyl carbitol | | | | | |
| Non-polar Solvent | | | | | |
| Isopar G | 97.9 | | | | 97.9 |
| Isopar H | | 94.9 | | | |
| Isopar L | | | 92.9 | | |
| Naphtha No. 6 | | | | | |
| Solvesso 150 | | | | | |
| IP Solvent 1620 | | | | 95.9 | |
| IP Solvent 2028 | | | | | |
| Pegasol AS-100 | | | | | |
| (Dispersing Agent) | | | | | |
| Solsperse 17000 | 0.1 | 0.1 | 0.1 | 0.1 | 0.1 |
| Average Particle Size μm | 3.0 | 2.5 | 4.5 | 3.8 | 3.0 |
| Viscosity mpa · s/at 25° C. | 2.3 | 2.2 | 3.3 | 4.6 | 2.3 |

| | Example 1-6 | Example 1-7 | Example 1-8 | Example 1-9 | Example 1-10 | Example 1-11 |
|---|---|---|---|---|---|---|
| (Coloring Component) Carbon Black | | | | | | |
| MA-100 | | | | | | |
| CF-9 | 5.0 | | | 5.0 | | |
| Organic Pigment | | | | | | |
| Paliogen Black 0084 | | 7.0 | | | 5.0 | |
| Hansa Yellow 10G | | | 4.0 | | | |
| Brilliant Carmine 6B | | | | | | |
| Phthalocyanine Blue | | | | | | 7.0 |
| Phthalocyanine Green | | | | | | |
| Processed Pigment | | | | | | |
| Microlith Black C-T | | | | | | |
| (Solvent) | | | | | | |
| Polar Solvent | | | | | | |
| Butyl cellosolve | | | | 94.9 | | |
| Methyl carbitol | | | | | 94.9 | |
| Ethyl carbitol | | | | | | 92.9 |
| Non-polar Solvent | | | | | | |
| Isopar G | | | | | | |
| Isopar H | 94.9 | | | | | |
| Isopar L | | 92.9 | | | | |
| Naphtha No. 6 | | | | | | |
| Solvesso 150 | | | | | | |
| IP Solvent 1620 | | | 95.9 | | | |
| IP Solvent 2028 | | | | | | |
| Pegasol AS-100 | | | | | | |

TABLE 1-continued

| (Dispersing Agent) | | | | | | |
|---|---|---|---|---|---|---|
| Solsperse 17000 | 0.1 | 0.1 | 0.1 | 0.1 | 0.1 | 0.1 |
| Average Particle Size μm | 2.5 | 4.5 | 3.8 | 2.5 | 4.0 | 5.0 |
| Viscosity mpa · s/at 25° C. | 2.2 | 3.3 | 4.6 | 5.4 | 4.2 | 5.2 |

TABLE 2

| Ink Composition | Example 2- | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (Coloring Component) Carbon Black | | | | | | | | | | | | | | | | |
| CF-9 | | 5.0 | | | | | | | | | | | | | | |
| MA-100 | 7.0 | | | | | | 6.0 | 6.0 | 6.0 | 6.0 | 6.0 | 6.0 | | | | |
| MA-7 | | | | | | | | | | | | | | | | |
| #44 | | | | | | | | | | | | | | | | |
| #5B | | | | | | | | | | | | | | | | |
| #45 | | | | | | | | | | | | | | | | |
| #900 | | | | | | | | | | | | | 5.0 | | | |
| Printex 75 | | | | | | | | | | | | | | | | |
| Printex 90 | | | | | | | | | | | | | | | | 5.0 |
| Raven 1020 | | | | | | | | | | | | | | | | |
| Raven 1255 | | | | | | | | | | | | | | 5.0 | | |
| Monarch 800 | | | | | | | | | | | | | | | | |
| Monarch 1100 | | | | | | | | | | | | | | | 5.0 | |
| Organic Pigment | | | | | | | | | | | | | | | | |
| Paliogen Black 0084 | | | 7.0 | | | | | | | | | | | | | |
| Hansa Yellow 10G | | | | 4.0 | | | | | | | | | | | | |
| Phthalocyanine Blue | | | | | 7.0 | | | | | | | | | | | |
| Phthalocyanine Green | | | | | | 8.0 | | | | | | | | | | |
| Metal Oxide (Iron Oxide) | | | | | | | | | | | | | | | | |
| MTB-15 | | | | | | | | | | | | | | | | |
| (Solvent) | | | | | | | | | | | | | | | | |
| Isopar G | | 79.9 | | | | | | | | | | | | | | |
| Isopar H | | | | | | | | 77.5 | 77.5 | 77.5 | 91.0 | 62.5 | 84.0 | 84.0 | 85.0 | 85.0 |
| Isopar L | | | | | | | | | | | | | | | | |
| Isopar M | 82.9 | | 82.9 | | | | | | | | | | | | | |
| Naphtha No. 6 | | | | | | 85.9 | | | | | | | | | | |
| Solvesso 150 | | | | | 87.9 | | | | | | | | | | | |
| IP Solvent 1620 | | | | | | | | | | | | | | | | |
| IP Solvent 2028 | | | | 83.9 | | | | | | | | | | | | |
| Pegasol AS100 | | | | | | | | | | | | | | | | |
| (Resin) | | | | | | | | | | | | | | | | |
| Super Ester A-75 | | | 2.0 | 12.0 | | | 15.0 | | | | 1.5 | 30.0 | 10.0 | 10.0 | 10.0 | 10.0 |
| YS Polyster T-80 | | 15.0 | | | | | | 15.0 | | | | | | | | |
| Escron G90 | | | | | | | | | 15.0 | | | | | | | |
| Ester Gum HP | 10.0 | | | | | | | | | 15.0 | | | | | | |
| Paralloide B67 | | | | | 5.0 | | | | | | | | | | | |
| Markeed No. 32 | | | | | | 6.0 | | | | | | | | | | |
| Hiretts HRT 200X | | | 8.0 | | | | | | | | | | | | | |
| (Dispersing Agent) | | | | | | | | | | | | | | | | |
| Solsperse 17000 | 0.1 | 0.1 | 0.1 | 0.1 | 0.1 | 0.1 | | | | | | | | | | |
| Nikkol T106 | | | | | | | 1.5 | 1.5 | 1.5 | 1.5 | 1.5 | 1.5 | | | | |
| Hexagline 4-0 | | | | | | | | | | | | | 1.0 | 1.0 | | |
| Nikkol MYS-IEX | | | | | | | | | | | | | | | | |
| Average Particle Size μm | 2.3 | 3.2 | 4.1 | 3.3 | 4.6 | 4.5 | 1.8 | 2.1 | 1.5 | 2.8 | 3.0 | 1.7 | 3.5 | 4.0 | 4.2 | 3.7 |
| Viscosity mpa · s/at 25° C. | 5.3 | 6.0 | 4.3 | 5.2 | 3.8 | 4.1 | 9.1 | 8.7 | 11.3 | 6.2 | 4.1 | 14.5 | 6.5 | 5.3 | 0.1 | 5.7 |

| Ink Composition | Example 2- | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| (Coloring Component) Carbon Black | | | | | | | | | | | | | | | | | |
| CF-9 | | | | | | | | | | | | | | | | | |
| MA-100 | | | | | | | | 1.0 | 20.0 | 1.0 | 20.0 | 1.0 | 20.0 | 5.0 | 5.0 | 5.0 | |
| MA-7 | | 5.0 | | | | | | | | | | | | | | | |
| #44 | | | 5.0 | | | | | | | | | | | | | | |
| #5B | | | | 5.0 | | | | | | | | | | | | | |
| #45 | | | | | 5.0 | | | | | | | | | | | | |
| #900 | 5.0 | | | | | | | | | | | | | | | | |
| Printex 75 | | | | | | | | | | | | | | | | | |
| Printex 90 | | | | | | | | | | | | | | | | | |
| Raven 1020 | | | | | | | 5.0 | | | | | | | | | | |
| Raven 1255 | | | | | | 5.0 | | | | | | | | | | | |
| Monarch 800 | | | | | | | | | | | | | | | | | |
| Monarch 1100 | | | | | | | | | | | | | | | | | |

TABLE 2-continued

| Organic Pigment | | | | | | | | | | | | | | | | | | | |
|---|---|---|---|---|---|---|---|---|---|---|---|---|---|---|---|---|---|---|---|
| Paliogen Black 0084 | | | | | | | | | | | | | | | | | | | |
| Hansa Yellow 10G | | | | | | | | | | | | | | | | | | | |
| Phthalocyanine Blue | | | | | | | | | | | | | | | | | | | |
| Phthalocyanine Green | | | | | | | | | | | | | | | | | | | |
| Metal Oxide (Iron Oxide) | | | | | | | | | | | | | | | | | | | |
| MTB-15 | | | | | | | | | | | | | | | | | | | 10.0 |
| (Solvent) | | | | | | | | | | | | | | | | | | | |
| Isopar G | | | | | | | | | | | | | | | | 83.7 | 83.7 | 88.7 | |
| Isopar H | 85.0 | 85.0 | 85.0 | 85.0 | 85.0 | 85.0 | 85.0 | | | | | | | | | | | | |
| Isopar L | | | | | | | | | | | | | | | | | | | |
| Isopar M | | | | | | | | | 97.99 | 88.99 | 86.5 | 67.5 | 64.0 | 45.0 | | | | | |
| Naphtha No. 6 | | | | | | | | | | | | | | | | | | | |
| Solvesso 150 | | | | | | | | | | | | | | | | | | | |
| IP Solvent 1620 | | | | | | | | | | | | | | | | | | | 74.8 |
| IP Solvent 2028 | | | | | | | | | | | | | | | | | | | |
| Pegasol AS100 | | | | | | | | | | | | | | | | | | | |
| (Resin) | | | | | | | | | | | | | | | | | | | |
| Super Ester A-75 | | | | | | | | | 1.0 | 1.0 | 10.0 | 10.0 | 30.0 | 30.0 | | | | 5.0 | 15.0 |
| YS Polyster T-80 | 10.0 | 10.0 | 10.0 | 10.0 | 10.0 | 10.0 | 10.0 | | | | | | | | 10.0 | 10.0 | | | |
| Escron G90 | | | | | | | | | | | | | | | | | | | |
| Ester Gum HP | | | | | | | | | | | | | | | | | | | |
| Paralloide B67 | | | | | | | | | | | | | | | | | | | |
| Markeed No. 32 | | | | | | | | | | | | | | | | | | | |
| Hiretts HRT 200X | | | | | | | | | | | | | | | | | | | |
| (Dispersing Agent) | | | | | | | | | | | | | | | | | | | |
| Solsperse 17000 | | | | | | | | | | | | | | | | 1.3 | 1.3 | 1.3 | |
| Nikkol T106 | | | | | | | | | | | | | | | | | | | 0.2 |
| Hexagline 4-0 | | | | | | | | | | | | | | | | | | | |
| Nikkol MYS-IEX | | | | | | | | | 0.01 | 0.01 | 2.5 | 2.5 | 5.0 | 5.0 | | | | | |
| Average Particle Size μm | 3.3 | 3.0 | 4.0 | 4.6 | 3.8 | 3.2 | 3.0 | | 5.0 | 3.1 | 4.8 | 3.0 | 3.3 | 3.1 | 1.0 | 1.1 | 1.0 | 5.0 | |
| Viscosity mpa·s/at 25° C. | 6.8 | 7.2 | 5.1 | 4.0 | 4.8 | 6.5 | 7.5 | | 2.4 | 18.5 | 3.5 | 23.0 | 11.3 | 30.0 | 9.4 | 10.8 | 8.3 | 5.3 | |

TABLE 3

(Test Results)

| | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 | Ex. 1-11 | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 |
|---|---|---|---|---|---|---|---|---|---|---|---|---|---|---|---|---|---|---|---|---|
| a-1 | ○ | ◎ | ◎ | ◎ | ○ | ◎ | ○ | ◎ | ◎ | ◎ | ◎ | ◎ | ◎ | ◎ | ◎ | ◎ | ◎ | ◎ | ◎ | ○ |
| a-2 | — | — | — | — | — | — | — | — | — | — | — | — | — | — | — | — | — | ◎ | ◎ | ◎ |
| a-3 | — | — | — | — | — | — | — | — | — | — | — | — | — | — | — | — | — | ◎ | ◎ | ◎ |
| a-4 | — | — | — | — | — | — | — | — | — | — | — | — | — | — | — | — | — | ◎ | ◎ | ◎ |
| a-5 | ○ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| a-6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |

| | Ex. 2-10 | Ex. 2-11 | Ex. 2-12 | Ex. 2-13 | Ex. 2-14 | Ex. 2-15 | Ex. 2-16 | Ex. 2-17 | Ex. 2-18 | Ex. 2-19 | Ex. 2-20 | Ex. 2-21 | Ex. 2-22 | Ex. 2-23 | Ex. 2-24 | Ex. 2-25 | Ex. 2-26 | Ex. 2-27 | Ex. 2-28 | Ex. 2-29 |
|---|---|---|---|---|---|---|---|---|---|---|---|---|---|---|---|---|---|---|---|---|
| a-1 | ○ | ◎ | ◎ | ○ | ◎ | ◎ | ◎ | ◎ | ◎ | ○ | ◎ | ◎ | ◎ | ◎ | ○ | ○ | ○ | ◎ | ○ | ◎ |
| a-2 | ◎ | ○ | ◎ | — | — | — | — | — | — | — | — | — | — | ◎ | — | — | — | — | — | — |
| a-3 | ◎ | ◎ | ◎ | — | — | — | — | — | — | — | — | — | — | ◎ | — | — | — | — | — | — |
| a-4 | ◎ | ◎ | ◎ | — | — | — | — | — | — | — | — | — | — | ◎ | — | — | — | — | — | — |
| a-5 | ◎ | ◎ | ○ | ○ | ◎ | ◎ | ◎ | ◎ | ◎ | ○ | ◎ | ◎ | ◎ | ◎ | ◎ | ◎ | ◎ | ○ | ◎ | ○ |
| a-6 | ◎ | ◎ | ◎ | ◎ | ◎ | ◎ | ◎ | ◎ | ◎ | ◎ | ◎ | ◎ | ◎ | ◎ | ○ | ○ | ◎ | ◎ | ◎ | ◎ |

| | Ex. 2-30 | Ex. 2-31 | Ex. 2-32 | Ex. 2-33 | Ex. 3-1 | Ex. 3-2 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| a-1 | ◎ | ◎ | ◎ | ◎ | ○ | ◎ | X | X | X | X | ○ | X | X |
| a-2 | — | — | — | ◎ | ◎ | ◎ | — | — | — | ◎ | — | — | — |
| a-3 | — | — | — | — | — | — | — | — | — | ◎ | — | — | — |
| a-4 | — | — | — | ◎ | ◎ | ◎ | — | — | — | ○ | — | — | — |
| a-5 | — | — | — | ○ | ◎ | ◎ | X | ◎ | ◎ | ◎ | X | X | ◎ |
| a-6 | — | — | — | ◎ | ◎ | ◎ | ○ | ◎ | ◎ | ◎ | ◎ | ◎ | ◎ |

As described above, when the ink for ink-jet of an image printed on ordinary paper, which has been a conventional problem, can be prevented, and a high-density image can be clearly produced. Moreover, the ink does not cause clogging. In the case where the ink prepared by dissolving or dispersing a resin in a solvent is used, an image can be printed even on an OHP sheet or the like, and the image has resistance for scratch. Also, the preservability of the ink is high.

Since a pigment is employed in the ink, the ink reveals the remarkable effect of imparting improved resistance for light as compared with conventional inks.

INDUSTRIAL APPLICABILITY

The ink composition for ink-jet printing according to the present invention is widely employable as an ink for use with an ink-jet printer which produces an image on an image-recording medium by jetting droplets of the ink thereon.

We claim:

1. An ink composition for ink-jet printing, comprising a coloring component and a dispersion medium in which said coloring component is homogeneously dispersed and retained,
    said coloring component being insoluble in said dispersion medium, and dispersed therein in the state of finely divided particles of an average particle size of 0.01 μm or more in an amount of 1-20% by weight, said coloring component comprising a metal oxide,
    said dispersion medium comprising a liquid having a maximum surface tension at 25° C. of 50 dyn/cm, and
    said ink composition having the property that said dispersion medium separates immediately from said coloring component when said ink composition is deposited on an image-recording material.

2. An ink composition for ink-jet printing, comprising a coloring component and a dispersion medium in which said coloring component is homogeneously dispersed and retained,
    said coloring component being insoluble in said dispersion medium, and dispersed therein in the state of finely divided particles of an average particle size of 0.01 μm to 10 pm in an amount of 1-20% by weight, at least 90% of the total particles of said coloring component have particle sizes which are within ±50% of an average particle size thereof,
    said dispersion medium comprising a liquid having a maximum surface tension at 25° C. of 50 dyn/cm, and
    said ink composition having the property that said dispersion medium separates immediately from said coloring component when said ink composition is deposited on an image-recording material.

3. An ink composition according to claim 2, wherein said ink composition further comprises a dispersing agent.

4. An ink composition according to claim 2, wherein said coloring component comprises carbon black having a determined value of DBP oil absorption of 100 ml/100 g as a maximum.

5. An ink composition according to claim 2, wherein said coloring component comprises carbon black having a determined value of specific surface area of 300 $m^2/g$ as a maximum.

6. An ink composition according to claim 2, wherein said dispersion medium comprises an organic solvent.

7. An ink composition according to claim 3, wherein the amount of said dispersing agent is 0.01-5 wt. %.

8. An ink composition for ink-jet printing, comprising a coloring component and a dispersion medium in which said coloring component is homogeneously dispersed and retained, said dispersion medium comprising a non-polar insulation solvent,
    said coloring component being insoluble in said dispersion medium, and dispersed therein in the state of finely divided particles of an average particle size of 0.01 μm or more in an amount of 1-20% by weight,
    said dispersion medium comprising a liquid having a maximum surface tension at 25° C. of 50 dyn/cm, and
    said ink composition having the property that said dispersion medium separates immediately from said coloring component when said ink composition is deposited on an image-recording material.

9. An ink composition according to claim 8, further comprising a resin which is soluble in said dispersion medium.

10. An ink composition according to claim 8, wherein said dispersion medium further comprises a resin.

11. An ink composition according to claim 10, wherein said resin comprises a polar resin.

12. An ink composition according to claim 10, wherein the amount of said resin is 1-30 wt. %.

13. An ink composition according to claim 10, further comprising a resin which is insoluble in said dispersion medium, said coloring component being contained in said resin, and said resin being dispersed in said dispersion medium.

* * * * *